United States Patent [19]

Jordan

[11] Patent Number: 5,762,696
[45] Date of Patent: Jun. 9, 1998

[54] TERPENE DIMER VARNISH AND INK FORMULATIONS AND RELATED METHODS OF MANUFACTURE

[75] Inventor: Thomas C. Jordan, Century, Fla.

[73] Assignee: Arizona Chemical Company, Panama City, Fla.

[21] Appl. No.: 684,696

[22] Filed: Jul. 19, 1996

[51] Int. Cl.$^6$ .................... C09D 11/08; C08L 93/04; C08L 91/00; C08K 5/01

[52] U.S. Cl. .................... 106/226; 106/31.96; 523/160; 524/313; 524/482; 524/499

[58] Field of Search .................... 523/160, 161; 524/482, 313, 499; 106/27 A, 30 R, 32, 226, 31.96

[56] References Cited

U.S. PATENT DOCUMENTS

| | | | |
|---|---|---|---|
| 2,249,112 | 7/1941 | Carmody | 585/20 |
| 2,825,657 | 3/1958 | Mock et al. | 106/239 |
| 3,287,206 | 11/1966 | Aldrich et al. | 106/226 |
| 3,401,136 | 9/1968 | Sellers | 524/474 |
| 3,415,769 | 12/1968 | Todd et al. | 524/474 |
| 3,415,893 | 12/1968 | Sellers et al. | 568/827 |
| 3,455,856 | 7/1969 | Voedisch et al. | 524/597 |
| 3,502,769 | 3/1970 | Fukuhara | 424/63 |
| 3,931,077 | 1/1976 | Uchigaki et al. | 524/272 |
| 4,032,493 | 6/1977 | Pascual | 524/488 |
| 4,052,549 | 10/1977 | Booth | 526/237 |
| 4,056,498 | 11/1977 | Laurito | 525/285 |
| 4,162,997 | 7/1979 | Walsh | 524/273 |
| 4,165,301 | 8/1979 | Wiegers et al. | 252/522 |
| 4,170,576 | 10/1979 | Hall et al. | 252/522 |
| 4,189,410 | 2/1980 | Laurito | 524/272 |
| 4,205,145 | 5/1980 | Tsuchiya et al. | 525/502 |
| 4,252,699 | 2/1981 | Tsuchiya et al. | 524/594 |
| 4,399,249 | 8/1983 | Bildusas | 524/271 |
| 4,433,100 | 2/1984 | Laurito | 525/54.42 |
| 4,574,057 | 3/1986 | Kaza et al. | 526/238.3 |
| 4,922,047 | 5/1990 | Chen et al. | 585/12 |
| 4,963,188 | 10/1990 | Parker | 106/20 |
| 4,963,630 | 10/1990 | Parker | 526/238.3 |
| 5,092,907 | 3/1992 | Riblet et al. | 8/645 |
| 5,167,704 | 12/1992 | Brower | 106/28 R |
| 5,256,478 | 10/1993 | Tanabe | 524/16 |

OTHER PUBLICATIONS

Vincent, John E., "Chemistry of Aluminum–Organics in the Preparation of Ink Vehicles and Gel Varnishes," American Ink Maker, p. 25 (Oct. 1984).

Roy et al., "Structural Studies on —Pinene Dimers," J. Indian Chem. Soc., 49(12):1222–1238 (1972).

Ritter et al., "Acid–Polymerized Dipinene," J. Am. Chem. Soc., vol. 62, pp. 1508–1511 (1940).

*Primary Examiner*—Peter A. Szekely
*Attorney, Agent, or Firm*—Ostrager Chong Flaherty & Onofrio

[57] ABSTRACT

An ink vehicle composition is provided comprising a polymeric type resin binder component and a terpene dimer oil. In an alternate embodiment the compositions further include an additional oil selected from linseed oil, soya bean oil, tung oil, or other oils having drying characteristics defined by an Iodine value greater than 120. Advantageously, the compositions contain a reduced amount of petroleum distillate solvent and lower volatile organic compounds (VOC) than conventional ink vehicles. As an ink vehicle the compositions are further incorporated into ink formulations. The varnish compositions are also used as an overprint varnish on a substrate surface.

32 Claims, 4 Drawing Sheets

TERPENE DIMER VARNISH AND INK FORMULATIONS AND RELATED METHODS OF MANUFACTURE

FIELD OF THE INVENTION

This invention generally relates to varnish compositions and methods of making the same. More particularly, it concerns compositions including a polymeric resin binder and a terpene dimer oil. The compositions are preferably alkyd free and alternatively include additional oils having drying characteristics defined by an Iodine value greater than 120. The varnish compositions are used as an ink vehicle or as an overprint varnish on a substrate surface. As an ink vehicle they are incorporated into ink formulations.

BACKGROUND ART

Conventional ink varnishes generally contain 3–20% of an alkyd component. The alkyd is a viscous liquid resin that toughens the ink film and functions in a varnish to improve gel structure in gelled varnishes.

Alkyd resins are conventionally made by condensation and the polymerization of dihydric or polyhydric alcohol (e.g. ethylene glycol or glycerol) with a polybasic acid (e.g. phthalic anhydride). Usually, a fatty acid or ester derived oil modifier is added to the reaction mix. More recently, a new class of alkyd resins are made by an epoxy addition polymerization in which a mixture of glycidyl esters and organic acid anhydrides are heated with a metal catalyst. Catalysts, typically metal catalysts, are necessary to dry coating compositions containing alkyds.

The invention compositions provide a varnish and ink formulation including a resin component and terpene dimer.

The ink vehicles of the present invention preferably do not contain an alkyd component and therefore do not require the presence of metal catalysts for drying. The functionalities that are typically supplied by an alkyd component are provided by the drying oil, most preferably the terpene dimer. Small amounts of an alkyd component are tolerable in the compositions, however, increasing amounts result in a slower drying process. The absence for the need of metal catalysts is significant since their presence adds undesirable color to clear overprint coatings.

The following patents are representative of varnishes and ink formulations which are known in the art.

U.S. Pat. No. 2,249,112 to Carmody discloses a process for the hydrogenation of terpene polymers. Polymerization of the terpenes is effected by a special catalyst—Attapulgus clay—or other catalysts including aluminum chloride, zinc chloride, tin tetrachloride and sulphuric acid. The terpene polymers formed are hydrogenated and saturated.

U.S. Pat. No. 2,825,657 to Mock et al. discloses zinc-calcium resinate varnishes for use as vehicles for printing inks.

U.S. Pat. No. 3,455,856 to Voedisch et al. discloses a printing ink composition containing a pigmented resin suspended in an oil modified alkyd resin vehicle. The alkyd resin (Trinol No. 3) is modified with a drying oil such as linseed oil. The ink vehicle is a liquid varnish.

U.S. Patent Nos. 4,056,498, 4,189,410 and 4,433,100 to Laurito all disclose petroleum hydrocarbon synthetic resins. In particular, Laurito '498 discloses a synthetic resin for use in printing ink compositions. The resin is a dibasic acid-modified hydrocarbon/tall oil resin for use in heat-set and gravure printing ink compositions. More specifically, the resin consists of an ethylenically unsaturated lower aliphatic dicarboxylic acid or anhydride with a base resin which includes a polymerized mixture of (a) dicyclopentadiene, (b) a mixture of dimerized aliphatic cyclic and non-cyclic dienes of five carbons and (c) tall oil.

The Laurito Patent '410 provides a dibasic acid-modified hydrocarbon resin composition similar to the composition in '498 except that the base resin is comprised of a polymerized mixture of (a) dicyclopentadiene, (b) a hydrocarbon-containing material selected from the group consisting of debutanized aromatic concentrates, C5 olefins and acyclic, conjugated C5 dienes and (c) fatty acid containing and rosin acid containing materials.

Laurito Patent '100 provides a composition comprising (a) dicyclopentadiene, (b) at least one hydrocarbon selected from the group consisting of mono-olefins, diolefins and polyenes each having more than five carbon atoms and no aromatic rings; and at least one member selected from the group consisting of fatty acid-containing materials and rosin acid-containing materials.

U.S. Pat. No. 4,162,997 to Walsh discloses nonvolatile, heat-set pastes of particulate thermoplastic polymers dispersed in a soft resinous phase. The paste composition comprises solid particles of a glassy thermoplastic polymeric material. The polymeric material is prepared from at least 51% of a monomer selected from the group consisting of acrylate-type monomers and monovinylidene aromatic monomers and has a glass transition temperature of at least 50°. The polymeric material is dispersed in a tackifying, cohesion-increasing material whose softening point is at or below room temperature. The composition further comprises a hardening agent selected from drying oils such as linseed oil and unsaturated alkyd resins.

U.S. Pat. No. 4,205,145 to Tsuchiya provides a process for preparing a resin for printing inks comprising reacting a particular 5-member cyclic compound with a phenolic compound; the resin produced is then reacted with an unsaturated carboxylic acid and then finally reacting the acid-modified resin with a resol-type phenol. U.S. Pat. No. 4,252,699 to Tsuchiya et al. provides a varnish composition for offset printing inks comprising 100 parts by weight of a novel resin; 50–200 parts by weight of a hydrocarbon solvent having a boiling point in the range of 200°–3500° C. and 10–100 parts by weight of a drying oil.

U.S. Pat. No. 4,574,057 to Kaza et al. discloses synthetic resins suitable for use in printing ink compositions. The resins are useful when incorporated into a gelled varnish formulation, e.g. with an ink oil and gelling agent. The compositions include (a) dicyclopentadiene; (b) at least one of a dimerized aliphatic cyclic and non-cyclic dienes of five carbon atoms, conjugated C-5 dienes (and others) having no aromatic rings; (c) at least one of a tall oil, fatty acid and rosin containing material; (d) at least one of a ethylenically unsaturated lower aliphatic dicarboxylic acid or anhydride and (e) a reactive member which may be a alcohol, glycol, glycerols, polyhydric alcohol, phenols and phenolic resin.

U.S. Pat. No. 4,963,188 to Parker discloses an ink composition that requires a coloring agent and a resin vehicle comprised of a resin acid-maleic anhydride polymer. The polymer is made by copolymerization of maleic anhydride reactive resin acids present in rosin or esters thereof and maleic anhydride in the presence of a free radical initiator. U.S. Pat. No. 4,963,630 to Parker is directed to the polymeric resin used in the ink composition in Parker '188.

U.S. Pat. No. 5,092,907 to Riblet et al. discloses a liquid colorant dispersion incorporated into plastic materials to produce a homogeneous coloration.

U.S. Pat. No. 5,167,704 to Brower discloses an ink composition comprising soy ink and pigment and a non-petroleum based organic solvent which improves soy ink drying speed. The ink composition is waterproof and comprises a mixture of soy ink and a non-petroleum based organic solvent selected from the group consisting of plant seeds, plant alkyd resins, varnishes, shellac, terpene oils and modified terpene oils. A paint composition comprising soy ink, pigment and natural non-petroleum alkyd resin is also provided.

From the prior art described, the Laurito, Walsh, Tsuchiya, Kaza and Parker patents all disclose use of particular resins which are intended to replace expensive rosin-modified phenolic resins for use as ink vehicle resins. The Laurito patents and Kaza provide petroleum hydrocarbon synthetic resins. Walsh claims a particular thermoplastic polymeric material which may be suspended in a hydrocarbon, ester or rosin mixture. The Tsuchiya patents are directed to particular hydrocarbon resins and the Parker patents provide a resin acid-maleic anhydride.

There is a need in the art for an alkyd-free varnish composition with improved drying without the use of metal catalysts. The invention provides alkyd-free varnish and ink formulations which include a resin component and a terpene dimer. Advantage of the invention compositions over known varnishes is in the inclusion of oils having particular drying properties as opposed to conventional alkyd liquid resins which require the presence of a metal catalyst to dry and toughen the ink film. Further advantage is in the reduction of the amount of petroleum distillates in the composition.

Accordingly, it is a broad object of the invention to provide an alkyd-free varnish including a polymeric type resin binder and a terpene dimer oil.

Another object of the invention is to provide a varnish composition including a terpene dimer oil which has improved drying properties over compositions including only alkali refined linseed oil and other traditionally used drying oils.

A specific object of the invention is to provide a varnish composition further containing at least one additional oil which is either drying or semi-drying defined by having an Iodine value (ASTM D 1959-85) greater than 120.

A more specific object of the invention is to provide an alkyd-free varnish which is used as an ink vehicle composition.

Another object of the invention is to provide an alkyd-free ink vehicle composition having a reduced amount of petroleum distillate solvent and lower volatile organic compounds (VOC).

A further object of the invention is to provide a lithographic printing ink for use in heatset, quickset and sheetfed printing applications.

Another more specific object of the invention is to provide an alkyd-free varnish which is used as an overprint coating on a substrate surface that dries to form a high gloss film without the use of metal catalysts.

Another object of the invention is to provide a process for manufacture of alkyd-free varnish compositions.

Another object of the invention is to provide varnish compositions for use in ink formulations which dry by the oxidation process.

DISCLOSURE OF THE INVENTION

In the present invention, these purposes, as well as others which will be apparent, are achieved generally by providing an ink vehicle composition comprising a polymeric type resin binder component and a terpene dimer. The composition may further include an additional oil selected from the group consisting of linseed oil, soya bean oil, tung oil, or other oils having Iodine values (ASTM D 1959-85) greater than 120.

In certain printing applications a gelled ink vehicle may be desired. Accordingly a gelling component may further be added to the compositions. The gelling component is preferably a 50/50 mixture of an oxyaluminuium acylate compound and a petroleum distillate solvent.

The varnish compositions are used as an ink vehicle, which may also be incorporated into ink formulations, or as an overprint varnish on a substrate surface. In all applications the compositions have fast drying properties. Preferably the compositions air dry into a hard tack free film without the conventional use of metal catalysts.

Other objects, features and advantages of the present invention will be apparent when the detailed description of the preferred embodiments of the invention are considered.

DETAILED DESCRIPTION OF THE PREFERRED EMBODIMENTS

In accordance with the present invention an ink vehicle composition is provided comprised of a polymeric type resin binder component and a terpene dimer. As used herein the terms varnish and vehicle are used interchangeably.

The terpene dimer is present in the composition up to 80 wt. % and is considered a drying oil which has an Iodine value greater than 120. Semi-drying and drying oils typically have Iodine values greater than 120. As described in FATS AND OILS, second edition, by H. G. Kirschenbauer, copyright 1960, Reinhold Publishing Corp., Library of Congress Catalog Card No. 60-10506, Iodine number is a measure of unsaturation of the fat and is defined as the number of grams of iodine absorbed by 100 grams of the substance. Difficulty has been encountered in determination of unsaturation of oils that possess conjugated double bonds such as tung oil and terpene dimer. The Wijs method (described in ASTM D 1959-85) under certain conditions will give nonquantitive but reproducible results in the case of conjugated unsaturation.

The Iodine values as used herein are determined by procedure described in ASTM D 1959-85 which states that in the presence of conjugated double bonds Iodine values are empirical and are useful for comparative purposes but not as a measure of total unsaturation.

Prior art practice has broadly disclosed terpene polymer compositions and methods of manufacture in a variety of applications. Terpene dimer, or dipinene, $C_{20}H_{32}$, resulting from the action of acids on alpha- or beta-pinene has been studied by various investigators since its discovery over a century ago by Deville, Ann. Chim. Phys. [2] 75, 66 (1840) and Ann. Chim. 37, 192 (1840) who obtained the substance from turpentine oil and sulfuric acid.

In an article by J. J. Ritter, "J. Am. Chem. Soc.", vol. 62, pp. 1508–09 (1940) the preparation of acid-polymerized dipinene is shown. The disclosure in Ritter is directed to the study of the structure of a dehydrogenated terpene dimer. The process conditions in Ritter for preparing the terpene dimer result in a product that includes more than 15% of higher terpene oligomers and has an Iodine value in the range of approximately 174 to 189. Terpene dimer compositions made by a phosphoric acid process described in co-pending application Ser. No. (not yet assigned) (which is a file-wrapper continuation of 08/227,807 filed Apr. 14, 1994, now abandoned) to Phillips et al. filed Jul. 9, 1996 entitled "TERPENE DIMER COMPOSITIONS AND RELATED METHODS OF MANUFACTURE" contain less than 5% oligomer and has an Iodine value in the range of approximately 230 to 242.

In an alternate embodiment the composition further comprises an additional oil such as linseed oil, soya bean oil, tung oil, or other oils having Iodine values (ASTM D 1959-85) greater than 120.

The composition may further include a gelling component. Preferably, the gelling component is a mixture of an organo-aluminum compound and a solvent. Representative of the types of organo-aluminum compounds used in the invention are disclosed in J. Vincent, *American Ink Maker*, October 1984, pages 25–34B, which is incorporated herein by reference. A preferred gelling component mixture consists of 50% of an oxyaluminium acylate compound and 50% of a petroleum distillate solvent.

The ink vehicle composition also may further comprise a solvent. The solvent is preferably a petroleum solvent present in the composition from 0 to 50 wt. %.

The polymeric type resin binder used in the compositions include esters of rosin or modified esters of rosin. Rosin esters are derived from the condensation of rosin with monohydric, dihydric and polyhydryic alcohols (e.g. pentaerythritol). Rosin is derived from pine trees (chiefly *Pinus palustris* and *Pinus elliottii*). Gum rosin is the residue obtained after the distillation of turpentine oil from the oleoresin tapped from living trees. Wood rosin is obtained by extracting pine stumps with naphtha and distilling off the volatile fraction. Tall oil rosin is co-product of the fractionation of tall oil. The principle constituents of rosin are rosin acids of the abietic and pimaric types. The acids usually have the general formula $C_{19}H_{29}COOH$ with a phenanthrene nucleus. The esters can be further modified by treatment with unsaturated acids or anhydrides (e.g. fumaric acid or maleic anhydride) or phenol-formaldehyde. In general, resins used in the present invention have high molecular weights, low aliphatic solubility and fairly high viscosity.

Other polymeric type resin binders used in the compositions include modified or unmodified hydrocarbon resins produced from hydrocarbon monomers containing from about 5 to 15 carbon atoms. The most common resins of this type are derived from 1,3 cyclopentadiene. Cyclopentadiene is formed along with many other hydrocarbon compounds in the cracking of petroleum. It is separated from $C_4/C_5$ fractions by thermal dimerization followed by distillation to produce a residual dicyclopentadiene concentrate. Dicyclopentadiene (DCPD) feedstocks vary in purity from high (90–95%) to medium (70–80%) to low purity mixtures of varying DCPD content. Co-dimers of DCPD and other dienes (e.g. butadiene, piperylene, isoprene) may also be present. DCPD can be thermally polymerized; no catalyst or initiator is necessary. Often DCPD is copolymerized with modifiers such as rosin or distilled tall oil to provide resins with improved properties for printing ink applications. Maleic anhydride in conjunction with a polyol may also be employed to modify such resins.

Typically the polymeric type resin binder component is present in compositions in the range of 20–70 wt. %. A preferred composition includes 20–70 wt. % of the polymeric resin; up to 40 wt % of the terpene dimer. In another preferred embodiment up to 40 wt % of the additional oil is added to the composition. Optionally, 0–5 wt % of a gelling component is also included in the compositions.

Advantageously, the varnish compositions are used to produce a lithographic printing ink. This lithographic printing ink is used in heatset, quickset and sheetfed printing applications.

The varnish compositions of the invention are also used as an overprint varnish to provide protection such as scuff resistance and additional gloss to the coated surface.

The compositions are made by combining the polymeric type resin binder with a terpene dimer to form a mixture. Heat is applied to the mixture until all of the resin has dissolved therein to form the varnish. The additional oil component, if present, is added to the mixture. The gelling component is added to the mixture after the resin is dissolved.

The following examples illustrate various aspects of the invention but are not to be interpreted as limiting it. In Example I a preferred ink vehicle or "varnish" of the invention is described which has approximately one half the amount of petroleum distillate solvent as most commercially sold ink vehicles. The method of preparing the varnish is also described. Examples II and III describe ink formulations which incorporate the varnish formulations described in Example I. Example IV illustrates the application as an overprint varnish. Example V illustrates the drying properties of terpene dimer.

EXAMPLE I

TERPENE DIMER VARNISH COMPOSITIONS AND PROCESS FOR PREPARING

Components of the invention varnishes include a resin component, ink solvents and, optionally, a gellant. Known varnishes generally contain about 40% of petroleum distillate solvents. The invention compositions preferably contain half that amount or more preferably only 17% of the petroleum distillates. Table I illustrates a representative varnish composition of the invention.

TABLE I

| EXAMPLE A VARNISH COMPOSITION | |
|---|---|
| WEIGHT % | COMPONENT |
| 42 | POLYMERIC RESIN BINDER* |
| 20 | ADDITIONAL OIL** |
| 20 | TERPENE DIMER |
| 2 | GELLANT SOLUTION+ |
| 16 | PETROLEUM DISTILLATE SOLVENT++ |

Key:
*-BECKACITE ® 101—maleic modified rosin ester, available from Arizona Chemical Company, Panama City, Florida.
**-ALKALI REFINED LINSEED OIL (ARLO).
+-OAO/MAGIESOL 47—50/50 mixture of oxyaluminum-octoate (OAO) commercially available from Chattem Chemicals, Chattanooga, TN and Rhone Poulenc, Princeton, NJ; and MAGIESOL 47—petroleum distillate solvent available from Magie Bros. Oil Co., Division of Pennzoil Corp.
++-MAGIESOL 52—petroleum distillate solvent, available from Magie Bros. Oil Co., Division of Pennzoil Corp.

The polymeric type resin binder in this formulation is a maleic modified rosin ester (BECKACITE®101), however, any polymeric type resin binder used for ink varnish may be used. This component functions, in part, as binder for the ink film.

A 50/50 mixture of alkali refined linseed oil (ARLO) and terpene dimer is used in the composition, however, in other embodiments the linseed oil may be totally replaced by terpene dimer. Other additional oils may also be used as long as they provide the desired drying properties which is defined as having Iodine values (ASTM D 1959-85) greater than 120.

In this example the invention varnish has a gel structure by design. However, typically the "gelling component" of the compositions are optional and depend on the desired application. Inks made from gelled vehicles are preferred for high speed presses and to improve print quality. In this example the gelling component used is a 50/50 mixture of oxyaluminum-octoate (OAO) and petroleum distillate solvent (MAGIESOL 47). OAO is an organo-aluminum compound which reacts with the carboxyl and hydroxyl groups in the resin system and produces the gel structure of the varnish.

The composition also includes a petroleum distillate solvent MAGIESOL 52 commercially available from Magie Bros. oil Co., Division of Pennzoil Corp. Both MAGIESOL products are hydrotreated petroleum distillates from which aromatic hydrocarbons have been removed. MAGIESOL 52 has a boiling point of 515° F. and is a preferred solvent in such lithographic processes as "SHEETFED" and "QUICK-SET" printing applications. MAGIESOL 47 has an initial boiling point of 465° F. and is a preferred solvent in "HEATSET" printing applications. Sheetfed, quickset and heatset inks are used in lithographic printing. The weight % of these components can be varied depending on the end use applications, but in any event are generally present in the composition at less than 20%.

Procedure for Producing the Varnish

The varnish is made by combining the resin, the linseed oil (additional oil), the terpene dimer and petroleum distillate into a flask equipped with stirring apparatus. Under a nitrogen atmosphere the flask is heated to 170° C. with stirring until all of the resin is dissolved in the ARLO, terpene dimer and solvent. The final component, the OAO gellant solution is then added at a slow rate to prevent gel lumps or "seeds" in the finished varnish. The OAO is allowed to react for 1 hour at 170° C. Upon completion the varnish is removed from the flask to a storage container.

Properties of the varnish were determined after 24 hours on a Laray Viscometer as described in.ASTM D4040-89. The results were:

TABLE II

EXAMPLE A - VARNISH PROPERTIES

| PROPERTY | VALUE |
| --- | --- |
| APPARENT VISCOSITY (poises) | 736 |
| PSEUDO YIELD VALUE (dynes/cm²) | 16,069 |
| SHORTNESS FACTOR | 21.8 |
| SLOPE (N value) | 0.690 |
| M47 TOLERANCE (ml/10 g) | 11 |

The apparent viscosity of a non-newtonian liquid is its viscosity at particular shear rate. A shear rate of 2500 sec$^{-1}$ has been found useful for inks and ink vehicles. This shear rate value is used in the calculations in determining the apparent viscosity values for the invention varnish compositions.

The yield value (pseudo yield value) is obtained by extrapolation of high shear measurements to a shear rate approaching zero. This extrapolation is subject to, in some cases, a high degree of variability, which is well understood by those in the ink and ink vehicle art.

The shortness factor is obtained by dividing the yield value by the viscosity and is best described as the property of a non-newtonian liquid that prevents it from being drawn into a filament.

The slope (N value) of the power law plot is the preferred measure of non-newtonianism. The value of N is 1.0 for a newtonian liquid and less than 1.0 for liquids which exhibit shear thinning behavior. The N value (0.690) shown in Table II indicates that the varnish has a gel structure.

The Magiesol 47 Tolerance (ml/10 g) value is a measurement of the solubility in the petroleum distillate. In making a suitable varnish it is desired to have a window of tolerance between 7–16 ml/10 g. If the tolerance is 7 or less then the solubility is too low and unsuitable for intended applications. This measurement was obtained by titrating 10 grams of the varnish (Example A) to cloud point with Magiesol 47. Magiesol 47 and Magiesol 52 are petroleum distillates conventionally used in ink and vehicle making and are trademarks of Magie Bros. Oil Co., Division of Pennzoil Corp.

EXAMPLE II

TERPENE DIMER—INK FORMULATIONS

The varnish formulations of the invention, as described in Example I, are combined with a "flush" (resin, ink oil and pigment) a wax component, and an ink solvent to form a lithographic printing ink.

The ink solvents used in the ink formulations of this example include Magiesol 52 (Example B) and terpene dimer (Example C).

The "flush" used in Examples B & C was BLUE QUICK-SET FLUSH which is a commercial product including phthalocyanine blue as the pigment. However, other suitable colorants can be used.

Example B shows an ink formulation (without use of metal driers) made with the terpene dimer modified varnish of Example A.

Example C shows an ink formulation (without use of metal driers) made with the terpene dimer modified varnish of Example A and replacing the petroleum distillate with terpene dimer. An additional 7.07% terpene dimer was added to the ink of Example C to adjust tack to equal the tack of Example B ink. The ink formulations are described in Table III below.

TABLE III

PRINTING INKS
EXAMPLES B AND C

| INGREDIENT | EXAMPLE B | EXAMPLE C |
| --- | --- | --- |
| EXAMPLE A VARNISH | 13.55 g | 13.55 g |
| BLUE QUICKSET FLUSH✦ | 7.50 g | 7.50 g |
| POLYTETRAFLUOROETHYLENE WAX COMPOUND✦✦ | 0.40 g | 0.40 g |
| POLYETHYLENE WAX COMPOUND✦✦ | 0.80 g | 0.80 g |
| MAGIESOL 52++ | 2.50 g | — |
| TERPENE DIMER | — | 2.50 g |
| TOTAL: | 24.75 g | 24.75 g |

KEY:
✦-QBP—quickset blue phthalocyanine "flush" available from General Press Colors, Ltd., Addison, Illinois.
✦✦-The wax components are commercially available from Carroll Scientific, Inc., 5401 Dansher Road, Countryside, Il. 60525-3127.
++-MAGIESOL 52—petroleum distillate solvent, available from Magie Bros. Oil Co., Division of Pennzoil Corp.

TABLE IV

INK PROPERTIES - EXAMPLES B & C

| PROPERTY | EXAMPLE B | EXAMPLE C |
|---|---|---|
| TACK[1] | 12.4 | 16.3 |
|  |  | Adjusted to 12.4 |
| GLOSS[2] | 13.8 | 17.9 |
| SET TIME[3] | 14 | 15.25 |

KEY:
[1]TACK is measured in gram-meters on an electronic inkometer at 1200 R.P.M, 90° F.
[2]GLOSS is measured at 60° angle with Gardner glossmeter and the pre-measured gloss of the coated paper is subtracted from the gloss value to eliminate variables caused by the paper stock. Values are average of four prints.
[3]SET TIME (in minutes) is determined when prints are tack-free to touch.

Examples B and C were printed on a Little Joe proofer (available from Little Joe Color Swatcher, Inc., Clark, New Jersey) with measured volumes of ink. Comparison of the ink properties between Examples B and C illustrate that higher gloss is obtained when using the terpene dimer as the ink solvent. (See "TABLE IV—INK PROPERTIES" above). Advantages of the invention are in the provision of a more environmentally friendly lithographic ink varnish/ vehicle and a lithographic ink having higher gloss than petroleum distillate inks, without the need for application of metal drying catalysts.

EXAMPLE III

TERPENE DIMER—INK FORMULATIONS

In this example additional experiments were conducted using terpene dimer in conventional lithographic ink formulations and comparing with conventional formulations using petroleum distillates.

Unexpectedly, it was found that the di-terpenes have unique properties that are useful in sheetfed and quickset inks. The varnish and ink formulations described below illustrate such when the terpene dimer component is increased in the formulation.

Examples D and F are vehicles made with the same components as described in Example A but have been modified as follows. Example D includes an alkyd, with no terpene dimer component and Example F replaces all alkyd, ARLO, ink oil and approximately 28% of the resin with a terpene dimer. Example E is the same vehicle as disclosed in Example A. The alkyd component in Example D is a conventional alkyd. See TABLE V. The varnish properties of these formulations are listed in TABLE VI below.

These vehicles were each incorporated into ink formulations, designated respectively, Examples G, H and I. See TABLE VII below.

The unique feature of the ink (Ink I) made from the varnish of Example F is the fact that the density, which indicates color transfer, and gloss are both higher, exactly the opposite of what is expected when lowering the resin content of the formulation. The varnish formulations, although significantly different in composition are designed to have properties closely bracketed for ink comparison.

The data in the TABLE VIII below illustrates a radical curve existing between the three formulas in squalene resistance, rub resistance, misting and drying properties as the amount of terpene dimer is increased in the ink formulation replacing other components. There are points within this curve as indicated in the table where no metal catalysts are needed to effect speedy ink film drying.

Tests indicate that holding a varnish at elevated reaction temperature (170° C.) for longer periods than the normal one hour OAO reaction will have adverse effect on drying properties and a lowering of the varnish viscosity

TABLE V

EXAMPLE D, E & F - VARNISH COMPOSITIONS

| COMPONENT | EXAMPLE D | EXAMPLE E | EXAMPLE F |
|---|---|---|---|
| POLYMERIC RESIN BINDER* | 42% | 42% | 30.30% |
| ADDITIONAL OIL** | 20% | 20% | — |
| TERPENE DIMER | — | 20% | 67.68% |
| ALKYD | 10% | — | — |
| GELLANT SOLUTION+ | 2% | 2% | 2% |
| PETROLEUM DISTILLATE SOLVENT++ | 26% | 16% | — |
| TOTAL: | 100% | 100% | 100% |

Key:
*-BECKACITE ® 101—maleic modified rosin ester, available from Arizona Chemical Company, Panama City, Florida.
**-ALKALI REFINED LINSEED OIL (ARLO).
+-OAO/MAGIESOL 47—50/50 mixture of oxyaluminum-octoate (OAO) commercially available from Chattem Chemicals, Chattanooga, TN and Rhone Poulenc, Princeton, NJ; and MAGIESOL 47—petroleum distillate solvent available from Magie Bros. Oil Co., Division of Pennzoil Corp.
++-MAGIESOL 52—petroleum distillate solvent, available from Magie Bros. Oil Co., Division of Pennzoil Corp.

TABLE VI

EXAMPLE D, E & F - VARNISH PROPERTIES

| PROPERTY | EXAMPLE D | EXAMPLE E | EXAMPLE F |
|---|---|---|---|
| APPARENT VISCOSITY (poises) | 841 | 736 | 821 |
| PSEUDO YIELD VALUE (dynes/cm$^2$) | 18,853 | 16,069 | 15,943 |
| SHORTNESS FACTOR | 22.4 | 21.8 | 19.4 |
| SLOPE (N value) | 0.685 | 0.690 | 0.699 |
| M47 TOLERANCE (ml/10 g) | 14 | 11 | 10 |

TABLE VII

EXAMPLE G, H, & I - INK FORMULATIONS

| COMPONENTS | EXAMPLE G | EXAMPLE H | EXAMPLE I |
|---|---|---|---|
| VARNISH | 13.55 g VARNISH D | 13.55 g VARNISH E | 13.55 g VARNISH F |
| FLUSH♦ | 7.50 g | 7.50 g | 7.50 g |
| POLYTETRA- FLUOROET HYLENE WAX COMPOUND♦♦ | 0.40 g | 0.40 g | 0.40 g |
| POLYETHYLENE WAX♦♦ | 0.80 g | 0.80 g | 0.80 g |
| PETROLEUM DISTILLATE SOLVENT ++ | 2.50 g | 2.50 g | — |

TABLE VII-continued

EXAMPLE G, H, & I - INK FORMULATIONS

| COMPONENTS | EXAMPLE G | EXAMPLE H | EXAMPLE I |
|---|---|---|---|
| TERPENE DIMER | — | — | 2.50 g |
| DRIER♦♦♦ | 0.25g | — | 0.25 g |
| TOTAL: | 25.00 g | 24.75 g | 25.00 g |

KEY:
♦-FLUSH used is the same as in EXAMPLE B & C; -QBP—quick set blue phthalocyanine "flush" available from General Press Colors, Ltd., Addison, Illinois.
♦♦-The wax components are commercially available from Carroll Scientific, Inc., 5401 Dansher Road, Countryside, Il. 60525-3127.
++-MAGIESOL 52—petroleum distillate solvent, available from Magie Bros. Oil Co., Division of Pennzoil Corp.
♦♦♦-Metal catalyst drier (Colbalt/Manganese drier) commercially available from Mooney Chemical, 2301 Scranton Road, Cleveland, Ohio, 44113-4395

TABLE VIII

EXAMPLE G, H & I - INK PROPERTIES

| PROPERTY | EXAMPLE G | EXAMPLE H | EXAMPLE I |
|---|---|---|---|
| GLOSS AT 60°$_a$ | 11.1 | 13.8 | 22.2 |
| MISTING$_b$ | <1 | 0 | 6 |
| SET TIME$_c$ | 15 min. | 14 min. | 20 min. |
| DENSITY$_d$ | 1.64 | 1.70 | 1.77 |
| SQUALENE RES.$_e$ | 23.4% | 3.6% | 48.2% |
| RUB RES.$_f$ | Standard | Equal to Standard | Poor |

KEY:
$_a$: Gardner glossmeter 60° angle, paper gloss was previously subtracted.
$_b$: Misting scale at 1200 RPM, 90° F.; 0 = No misting, 10 = Extreme misting
$_c$: Average dry time (tackfree to touch) of four prints.
$_d$: Cosar SOS 40 reflection densitometer.
$_e$: One drop squalene spot test (one hour). The value listed is percent color density lost from the tested spot. (24 hr. cured prints were used).
$_f$ Sutherland rub tester, 50 rubs/4 lb. wt.

It is noted that in Example I (Table VIII) the ink would set too slow to be quickset without driers. This is due in part to the fact that the drying oil has replaced a quantity of the solid resin in the varnish (Example F. Table V) thus the drying rate is slower. (This statement relates to the curve where there are points within where no catalysts are required—See Table VI & VII.)

EXAMPLE IV

TERPENE DIMER—OVERPRINT VARNISH COMPOSITIONS

The varnish compositions of the invention, as described in Example A, comprising a polymeric type resin binder and terpene dimer without any other drying oils were found to be suitable as clear overprint coatings. These compositions were found to have drying properties without the need for metal catalysts which is significant since generally metal catalyst solutions add undesirable color to clear overprint coatings. The varnish compositions when printed on clay coated stock showed high gloss and air dried in under 10 minutes.

The varnish formulation from Example A was coated on paper stock under the following conditions:

PRESS: Little Joe Color Swatcher (S80), Little Joe Color Swatcher, Inc., Clark, N.J.

PAPER: Coated book stock, available from the Leneta Company, Mahwah, N.J., 07430

PLATE SIZE: 4 in.×6 in. (24 in$^2$)

AMOUNT OF VARNISH APPLIED: 0.9 grams

Physical properties of the prints were tested and resulted in a gloss @ 60° angle of 51.9 (measured using Micro Tri Gloss No. 4525, BYK Gardner Inc., Silver Spring, Md. 20910) and a dry (tack free) time of approximately 7 minutes.

EXAMPLE V

This example illustrates the drying properties of the terpene dimer used in the invention compositions. The drying properties of the terpene dimer samples were tested and compared using two different methods: (1) the Fourier transform infrared (FTIR) spectrometer method and (2) the 5 mil drawdown/set-to-touch method.

Terpene dimer samples prepared by different processes were tested. SAMPLE A and SAMPLE B. SAMPLE A contained approximately 85% dimer and 15% higher oligomer and has an Iodine value in the range of approximately 174–189. SAMPLE B contained over 90% dimer and less than 5% higher oligomer and has an Iodine value in the range of approximately 230–242.

Procedure for FTIR Illustration of the Drying Properties of Terpene Dimer

A fourier transform infrared (FTIR) spectrometer was used to illustrate the oxidative drying properties of terpene dimer compositions. It was found that the compositions of the invention dry extremely well by oxidation. Due to the chemical reactions occurring during drying by oxidation the coated invention compositions do not lose mass.

Figure 1A:
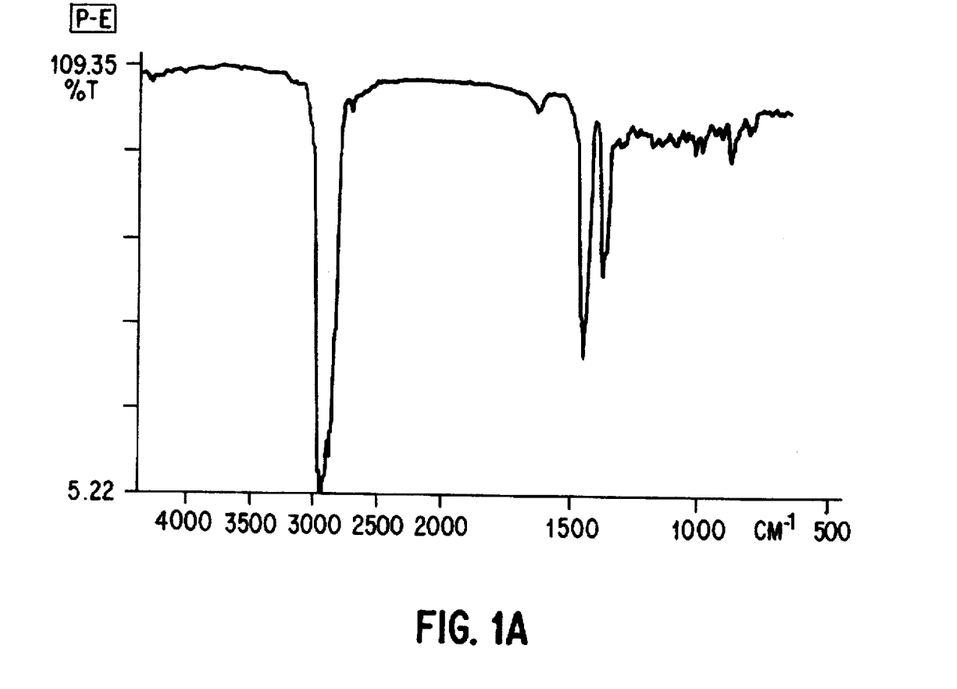
FIGS. 1A, 1B and 1C are fourier transform infrared spectrometer graphs, initially, after 7 hours and after 24 hours, respectively, of terpene dimer SAMPLE A illustrating the oxidation drying properties of terpene dimer prepared in accordance with EXAMPLE V.
Figure 1B:
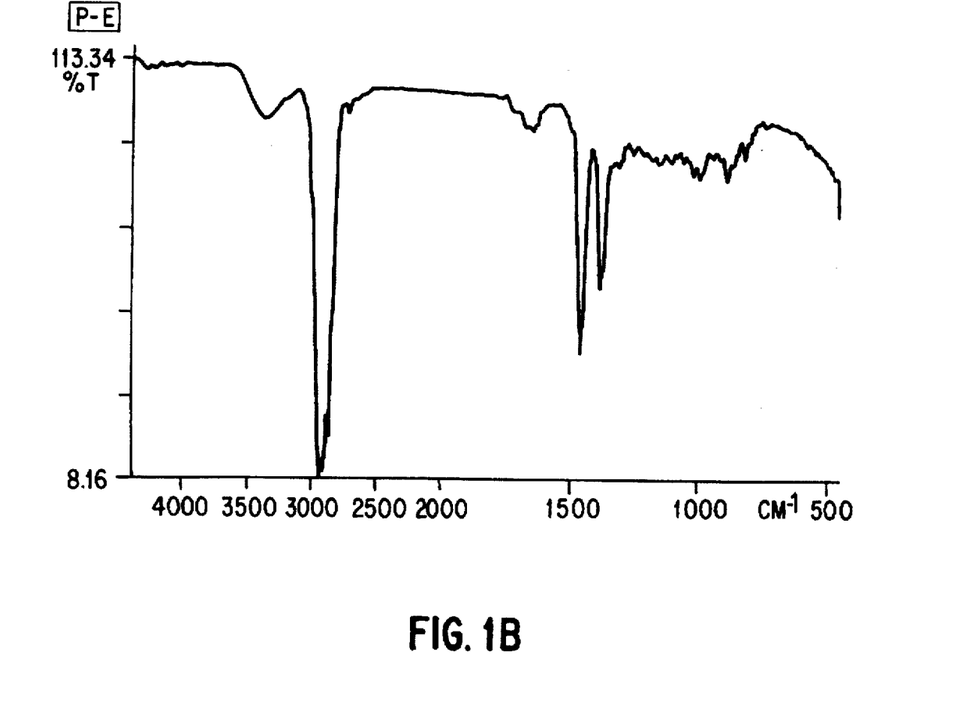
Figure 1C:
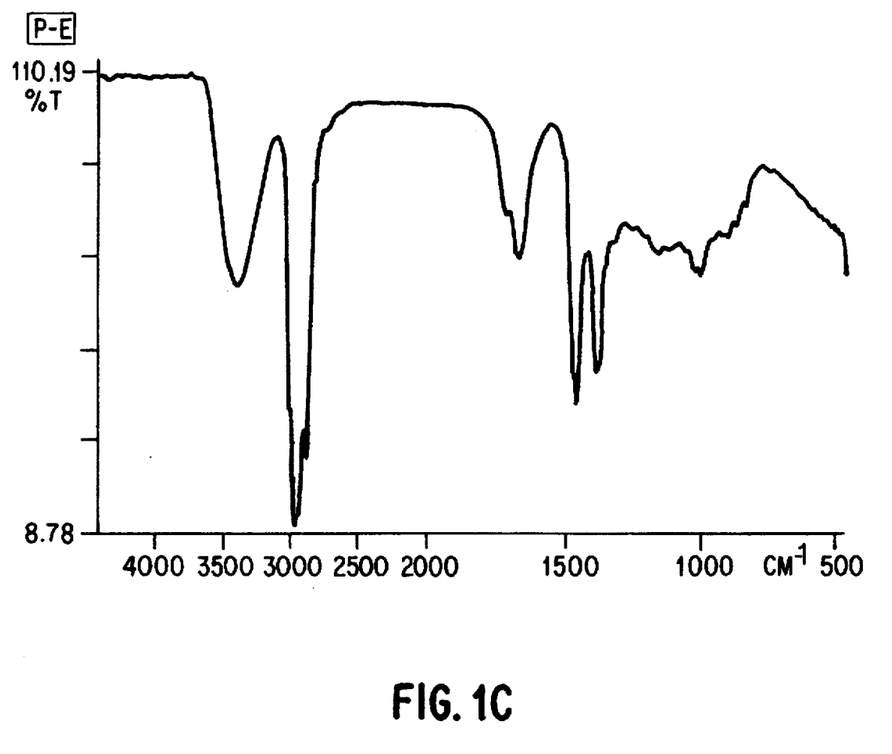
Figure 2A:
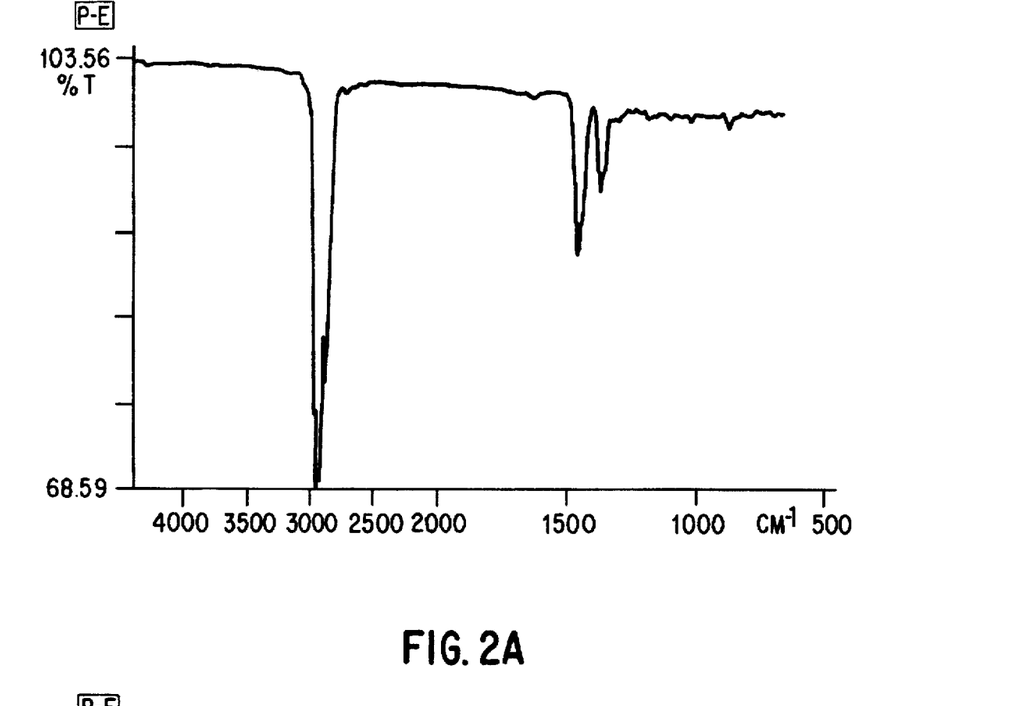
FIGS. 2A, 2B and 2C are fourier transform infrared spectrometer graphs, initially, after 7 hours and after 24 hours, respectively, of terpene dimer SAMPLE B illustrating the oxidation drying properties of terpene dimer prepared in accordance with EXAMPLE V.
Figure 2B:
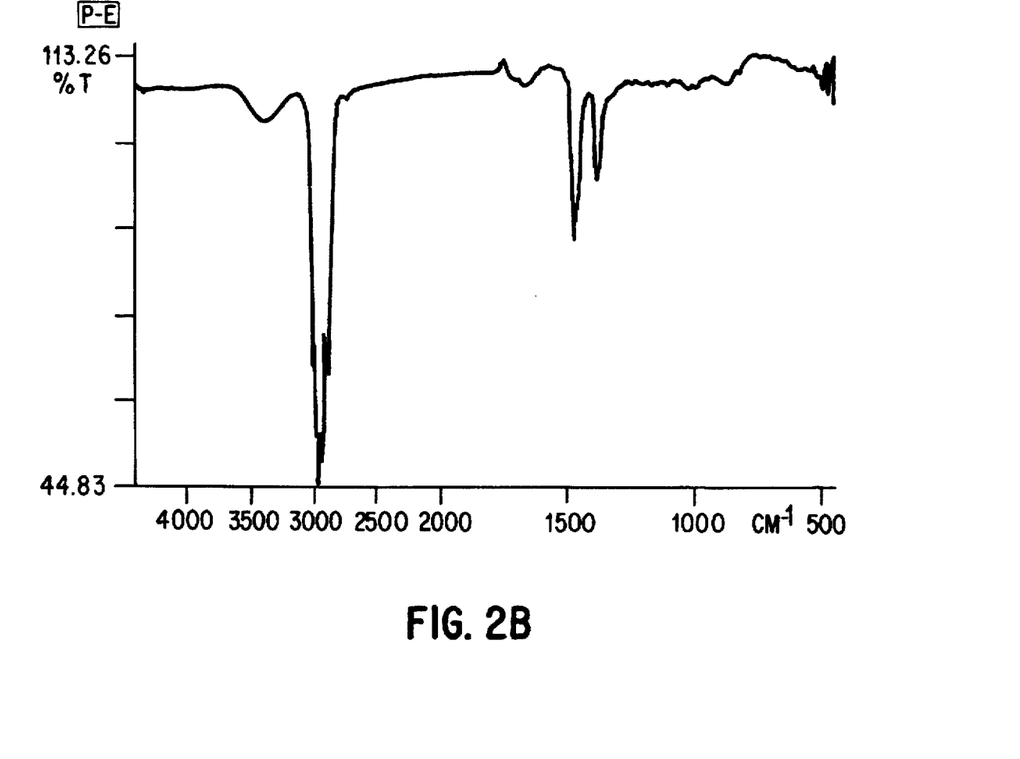
Figure 2C:
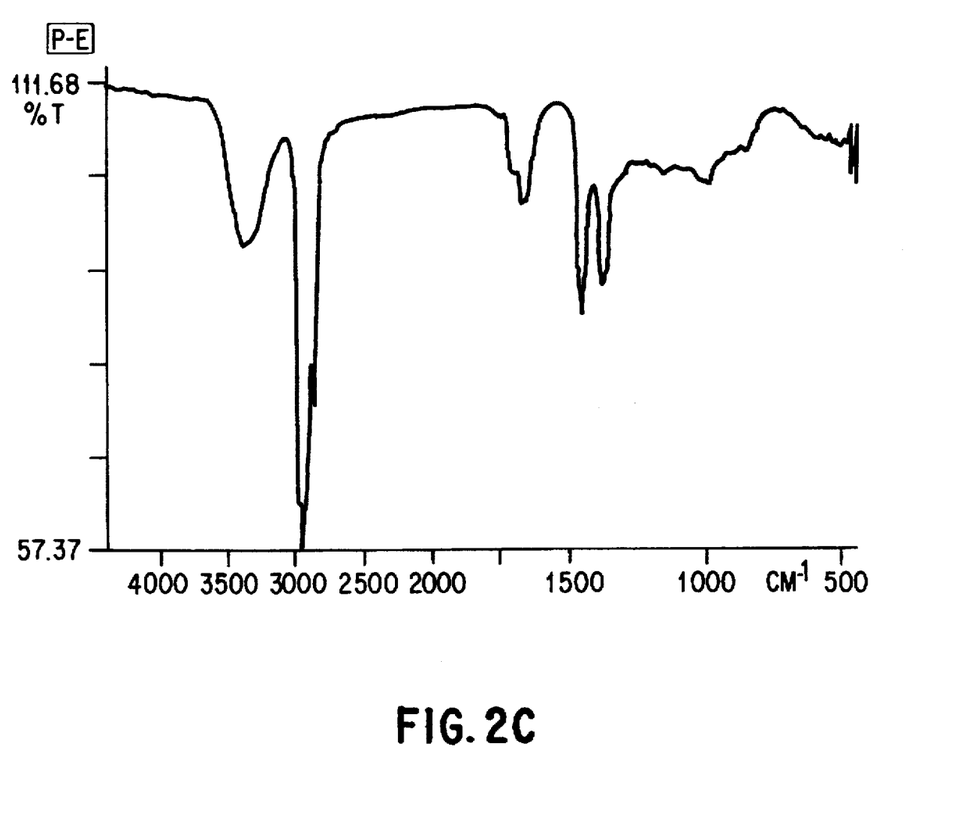

A sample of SAMPLE A and SAMPLE B described above were placed on an IR plate and scanned initially, after 7 hours drying time and after 24 hours drying time. The results of these scans are shown in FIG. 1A (SAMPLE A) and FIG. 2A (SAMPLE B)—initial scan; FIG. 1B (SAMPLE A) and FIG. 2B (SAMPLE B)—after 7 hours drying time; and FIG. 1C (SAMPLE A) and FIG. 2C (SAMPLE B)—after 24 hours drying time. These scans show equal oxidation of both SAMPLE A and B at the critical first few hours, FIGS. 1B and 2B.

Procedure for 5 mil drawdown/set-to-touch illustration of the Drying Properties of Terpene Dimer Films of terpene dimer SAMPLE A and SAMPLE B were drawn on glass plates with a five mil gage and tested for drying to touch. Both samples dry tack free to the touch in less than fifteen hours (overnight).

Advantageously, the terpene dimer compositions used in the invention are derived from naturally occurring monoterpenes and are essentially non-toxic. Preferred applications of the terpene dimer varnishes include incorporation into an ink formulation or use as an overprint varnish coating. The primary unique attribute of incorporating the terpene dimer oil into the compositions is that its presence allows the compositions to body upon exposure to air and dry into a hard tack-free film.

The terpene dimer compositions have major advantages over solvents such alkali refined linseed oil, petroleum solvents or mineral spirits that must be used in many coatings applications to perform the same function. The compositions are relatively non-volatile compared to mineral spirits. An alkyd formulation containing terpene dimer in place of mineral spirits would have reduced emissions and would contain an environmentally "green" solvent, but one that would body and air dry to become part of the film. The combination of low viscosity, solvency features plus the bodying are the compositions attributes.

It will be recognized by those skilled in the art that the use of terpene dimer as a low viscosity oil as a component in a varnish composition has wide application where film bodying, viscosity increase or oxidative drying is beneficial or essential.

In side by side drying experiments comparing the terpene dimer oil (SAMPLE B of EXAMPLE V) with linseed oil it was demonstrated that a film of the dimer oil exposed to air unexpectedly dried into a hard, tack free layer. Linseed oil without a metallic dryer added was inferior to the terpene dimer oil in drying by the oxidation process. Linseed oil is common to inks, paints, enamels and varnishes and an alternative derived from monoterpenes such as alpha pinene is unique.

Numerous modifications are possible in light of the above disclosure such as utilizing the dimer in applications in place of linseed oil and also in combining the terpene dimer with a wide variety of additional components.

Therefore, although the invention has been described with reference to certain preferred embodiments, it will be appreciated that other composite structures and processes for their fabrication may be devised, which are nevertheless within the scope and spirit of the invention as defined in the claims appended hereto.

I claim:

1. An ink vehicle composition comprising:
   a resin binder component and a terpene dimer; wherein said resin binder is selected from the group consisting of esters of rosin, modified esters of rosin, modified hydrocarbon resins produced from hydrocarbon monomers containing from about 5 to 15 carbon atoms, and unmodified hydrocarbon resins produced from hydrocarbon monomers containing from about 5 to 15 carbon atoms.

2. The composition according to claim 1, further comprising an additional oil selected from the group consisting of linseed oil, soya bean oil, tung oil, and other oils having Iodine values (ASTM D 1959-85) greater than 120.

3. The composition according to claim 1, further comprising a gelling component.

4. The composition according to claim 3, wherein the gelling component is a mixture of an organo-aluminum compound and a solvent.

5. The composition according to claim 4, wherein said gelling component is 50% of an oxyaluminium acylate compound and 50% of a petroleum distillate solvent.

6. The composition according to claim 1, further comprising a solvent.

7. The composition according to claim 6, wherein said solvent is a petroleum solvent and is present in the composition up to 50 wt. %.

8. The composition according to claim 1, wherein said resin binder is present in the range of 20–70 wt. %.

9. The composition according to claim 1, wherein said terpene dimer is present in the composition up to 80 wt. %.

10. The composition according to claim 2, comprising:
    20–70 wt. % of said resin;
    up to 40 wt % of said terpene dimer
    up to 40 wt % of said additional oil; and
    0–5 wt % of a gelling component.

11. A lithographic printing ink having the property of drying into a hard tack-free film upon exposure to air comprising an ink vehicle composition according to claim 1 and an ink solvent.

12. An overprint varnish composition having the property of drying into a hard tack-free film upon exposure to air comprising:
    a resin binder component and a terpene dimer; wherein said resin binder is selected from the group consisting of esters of rosin, modified esters of rosin, modified hydrocarbon resins produced from hydrocarbon monomers containing from about 5 to 15 carbon atoms, and unmodified hydrocarbon resins produced from hydrocarbon monomers containing from about 5 to 15 carbon atoms.

13. The composition according to claim 12, further comprising an additional oil selected from the group consisting of linseed oil, soya bean oil, tung oil, and other oils having Iodine values (ASTM D 1959-85) greater than 120.

14. The composition according to claim 12, further comprising a gelling component.

15. The composition according to claim 14, wherein the gelling component is a mixture of an organo-aluminum compound and a solvent.

16. The composition according to claim 15, wherein said gelling component is 50S of an oxyaluminium acylate compound and 50% of a petroleum distillate solvent.

17. The composition according to claim 12, further comprising a solvent.

18. The composition according to claim 17, wherein said solvent is a petroleum solvent and is present in the composition up to 50 wt. %.

19. The composition according to claim 13, wherein said resin binder is present in the range of 20–70 wt. %.

20. The composition according to claim 13, wherein said terpene dimer is present in the composition up to 80% wt. %.

21. The composition according to claim 13, comprising:
    20–70 wt. % of said resin;
    up to 40 wt % of said terpene;
    up to 40 wt % of said additional oil; and
    0–5 wt % of said gelling component.

22. A process for producing a varnish composition comprising:
    combining a resin binder component with a terpene dimer to form a mixture;
    heating said mixture until all said resin is dissolved to form the varnish;
    wherein said resin binder is selected from the group consisting of esters of rosin, modified esters of rosin, modified hydrocarbon resins produced from hydrocarbon monomers containing from about 5 to 15 carbon atoms, and unmodified hydrocarbon resins produced from hydrocarbon monomers containing from about 5 to 15 carbon atoms.

23. The process according to claim 22, wherein at least one additional oil selected from the group consisting of linseed oil, soya bean oil, tung oil, and other oils having Iodine values (ASTM 1959-85) greater than 120 is added to said mixture.

24. The process according to claim 22, wherein after said resin is dissolved a gelling component is added.

25. The process according to claim 24, wherein said gelling component is a mixture of an organo-aluminum compound and a solvent.

26. The process according to claim 25, wherein said gelling component is 50% of an oxyaluminium acylate compound and 50% of a solvent.

27. The process according to claim 22, wherein said mixture further includes a solvent.

28. The process according to claim 27, wherein said solvent is a petroleum solvent and is present in the composition up to 50 wt. %.

29. The process according to claim 22, wherein said mixture comprises: 20–70 wt. % of said resin and up to 80 wt % of said terpene dimer.

30. The process according to claim 29, wherein up to 5 wt % of a gelling component is added to said mixture.

31. The process according to claim 23, wherein said mixture comprises: 20–70 wt. % of said resin; up to 40 wt. % of said terpene dimer and up to 40 wt. % of said additional oil.

32. The process according to claim 31, wherein up to 5 wt % of a gelling component is added to said mixture.

* * * * *

UNITED STATES PATENT AND TRADEMARK OFFICE
CERTIFICATE OF CORRECTION

PATENT NO. : 5,762,696
DATED : June 9, 1998
INVENTOR(S) : Jordan

It is certified that error appears in the above-indentified patent and that said Letters Patent is hereby corrected as shown below:

Column 2, line 42, change "3500°C" to --350°C--

Signed and Sealed this

First Day of September, 1998

BRUCE LEHMAN

Attest:

Attesting Officer

Commissioner of Patents and Trademarks